H. W. SHAAR.
PNEUMATIC TIRE RELINER.
APPLICATION FILED JAN. 24, 1917.

1,298,581.

Patented Mar. 25, 1919.

WITNESSES:
G. C. Matheny
R. J. Cook

INVENTOR
HAMDAN W. SHAAR
BY
Cook & Matheny
ATTORNEY

UNITED STATES PATENT OFFICE.

HAMDAN W. SHAAR, OF MONROE, WASHINGTON.

PNEUMATIC-TIRE RELINER.

1,298,581.  Specification of Letters Patent.  Patented Mar. 25, 1919.

Application filed January 24, 1917. Serial No. 144,538.

*To all whom it may concern:*

Be it known that I, HAMDAN W. SHAAR, a subject of the Sultan of Turkey, residing at Monroe, in the county of Snohomish and State of Washington, have invented new and useful Improvements in Pneumatic-Tire Reliners, of which the following is a specification.

This invention relates to improvements in reliners for pneumatic tires, and the object of this improvement is to provide a reliner that is built up of a plurality of metallic sections whereby it will be absolutely puncture proof and will have great wearing qualities.

Other advantages reside in the more specific forms of construction hereinafter described and claimed.

The invention consists in the novel construction and combination of metallic and fabric parts to form a re-liner that is flexible, puncture proof and possesses great wearing qualities.

Figure 1:
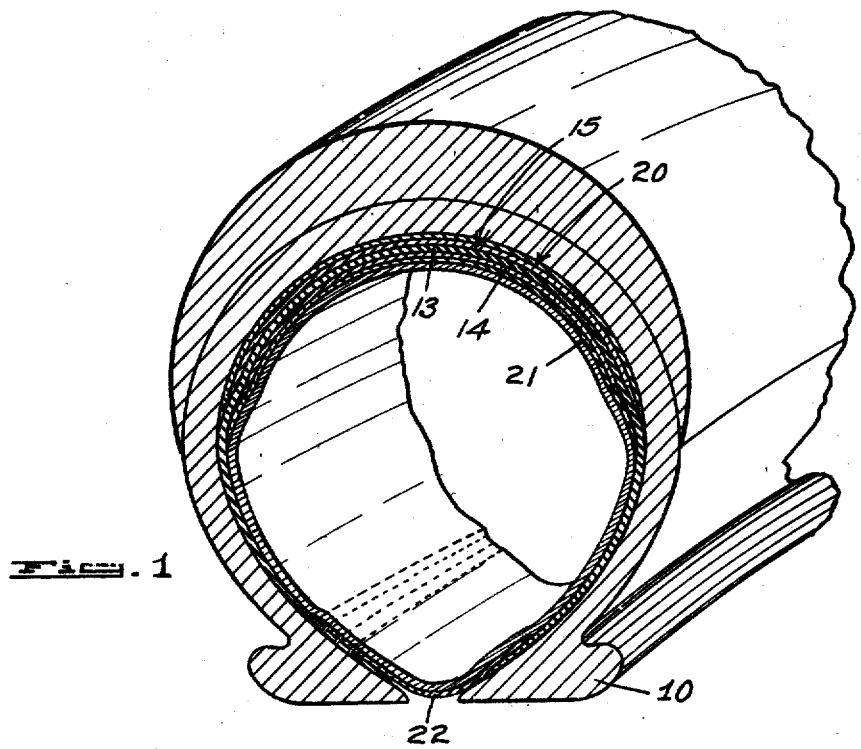
Figure 2:
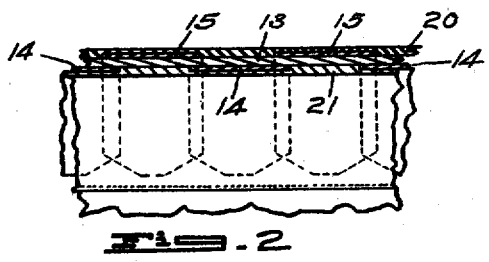
Figures 5, 6:
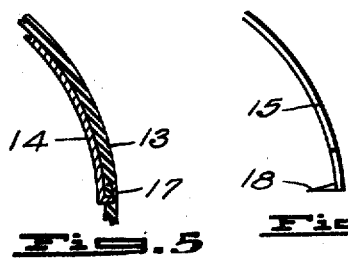
Figure 3:
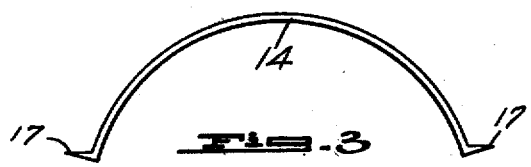
Figure 7:
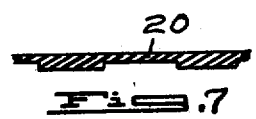
Figure 4:
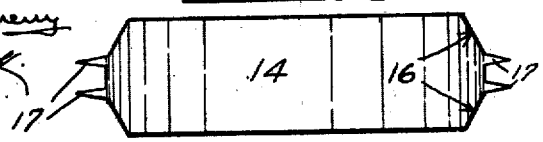

In the accompanying drawings Figure 1 is a view in sectional perspective of a tire that is fitted with this re-liner; Fig. 2 is a fragmentary view in longitudinal mid-section of the re-liner; Fig. 3 is a view in side elevation of one of the metallic sections used on the inner surface of this re-liner; Fig. 4 is a plan view of the device shown in Fig. 3; Fig. 5 is a fragmentary sectional view illustrating the manner of securing the metallic section shown in Fig. 3 to the body of the re-liner; Fig. 6 is a fragmentary view in side elevation of one of the metal sections that is adapted to be applied to the outside of the re-liner, and Fig. 7 is a fragmentary sectional view of a detail of the invention.

Referring to the accompanying darwings throughout which like reference numerals indicate like parts, the numeral 10 indicates a tire casing of the usual form and 11 is an inner tire tube that may be placed within the casing in a well known manner, the re-liner that comprises this invention being inserted within the casing between the inner wall of the casing and the tube 11.

The re-liner consists of a body member 13 of fabric, rubberized fabric, or any durable material that is shaped to fit within a pneumatic tire casing of the usual form and has a plurality of metallic sections 14 of relatively narrow width secured on its inside surface at spaced intervals and extending around the inside of the tread portion thereof, and a plurality of similar metallic sections 15 secured on its outer surface in offset positions with respect to said sections on said inner surface, as more clearly illustrated in Fig. 2, the edges of the sections 14 and 15 overlapping so that a tack or sharp instrument can not penetrate the re-liner at any point on the tread without encountering the metallic sections and being prevented thereby from puncturing the inner tube.

The inner sections 14 are preferably beveled off on the corners as indicated at 16, and are each provided on each end with outwardly directed prongs 17 that are adapted to be clenched into the re-liner body 13, as more clearly shown in Fig. 5, to secure the metallic sections to the body of the re-liner.

The outer sections 15 have their corners beveled off and are provided with inwardly directed prongs 18 that are adapted to be clenched into the body member 13 of the re-liner in the same manner as the prongs 17.

20 is a piece of fabric or rubber composition that is adapted to be placed on the outside of the outer metallic sections 15 and sewed or vulcanized to the body member 13 to protect the inner walls of the tire casing from contact with the metallic members 15, and 21 is a similar piece of material that is sewed or vulcanized to the inner walls of the re-liner to prevent the inner tube from coming in contact with and wearing on the inner metallic members 14.

22 is a flap of thin material that is sewed to one edge of the re-liner member 13 to overlap the space where the two edges of the tire casing come together on the rim of the wheel.

The metallic sections 14 and 15 are preferably stamped out of galvanized sheet metal that is relatively thin but is strong enough to turn or bend the point of a tack or nail that may find its way through the tire casing.

A re-liner constructed as hereinbefore described is flexible, so that it does not detract from the resiliency of the tire, is not expensive or difficult to construct, has great wearing qualities and will prevent both punctures and blow-outs.

The tread portion of the reliner is relatively heavy and is reinforced with the metal sections so that it will hold and protect the inner tube under the pressure of inflation even though the outer tire casing is almost worn out. The reliner thus enables the user to get more wear out of his outer tire casings than could otherwise be done.

Fig. 7 illustrates the structure of the protective coverings 20 and 21, such structure serving to compensate for the unevenness of the metallic sections of the reliner.

What I claim and desire to protect by Letters Patent is:

A re-liner for pneumatic tires comprising an intermediate body portion of strong flexible material, a plurality of narrow metallic strips of arcuate shape extending transversely around the interior of said body portion, said strips being spaced apart and having outwardly directed integral prongs formed on the ends thereof clenched into said body portion to secure said metallic strips against the inner face thereof, a plurality of narrow metallic strips of arcuate shape extending in a transverse direction around the exterior of said body portion in a position to bridge the spaces between said interiorly disposed metallic strips, each of said exteriorly disposed strips having inwardly directed prongs on the ends thereof clenched into said body portion to secure said last-named metallic strips against the outer face thereof, and inner and outer flexible protective coverings for said metallic strips, said coverings being transversely grooved for reception of said metallic strips in one face thereof substantially as described.

Signed by me at Everett, Washington, this 12th day of January, 1917.

HAMDAN W. SHAAR.

Witnesses:
C. M. WILLIAMS,
C. S. BALDWIN.